United States Patent [19]
Wong

[11] Patent Number: 5,535,665
[45] Date of Patent: Jul. 16, 1996

[54] STIRRER ASSEMBLY FOR AUTOMATED COOKING MACHINE

[76] Inventor: Don M. Wong, 2296 Bunker Hill Dr., San Mateo, Calif. 94402

[21] Appl. No.: 487,668

[22] Filed: Jun. 7, 1995

[51] Int. Cl.⁶ .............................. A47J 27/00; B01F 7/00
[52] U.S. Cl. .............................. 99/348; 99/409; 366/244; 366/261; 366/287; 366/292
[58] Field of Search ........................... 99/348, 395–397, 99/398, 409, 328, 331; 366/261, 279, 241–254, 282, 287, 289, 292–295, 312, 331, 343

[56] References Cited

U.S. PATENT DOCUMENTS

| | | |
|---|---|---|
| 277,876 | 5/1883 | Brown . |
| 536,986 | 4/1895 | Dunlap . |
| 2,898,094 | 8/1959 | O'Neill, Jr. ........................ 366/289 |
| 3,305,139 | 2/1967 | Ward . |
| 3,357,685 | 12/1967 | Stephens ........................ 99/348 |
| 3,722,835 | 3/1973 | Knott ........................ 366/289 |
| 3,905,585 | 9/1975 | Wallman . |
| 4,095,286 | 6/1978 | Ellis ........................ 366/293 |
| 4,114,523 | 9/1978 | Eff . |
| 4,310,437 | 1/1982 | Schreiber ........................ 366/295 |
| 4,311,397 | 1/1982 | Wright ........................ 366/287 |
| 4,436,432 | 3/1984 | Drocco ........................ 99/348 |
| 4,544,281 | 10/1985 | Wilkinson . |
| 4,606,235 | 8/1986 | Kindt . |
| 4,649,810 | 3/1987 | Wong . |
| 4,693,610 | 9/1987 | Weiss . |
| 4,779,522 | 10/1988 | Wong ........................ 99/348 |
| 4,820,054 | 4/1989 | Wong ........................ 366/287 |
| 4,942,807 | 7/1990 | Wong . |
| 5,013,158 | 5/1991 | Tarlow ........................ 99/348 |
| 5,176,069 | 1/1993 | Chen ........................ 99/348 |
| 5,442,996 | 8/1995 | Chiodini ........................ 99/348 |

*Primary Examiner*—Timothy F. Simone
*Attorney, Agent, or Firm*—Townsend and Townsend and Crew

[57] ABSTRACT

A stirrer assembly (2), finding particular utility for use with an automatic cooking machine, includes a drive assembly (4) having first and second drivers and a drive housing (16). A dual axis spatula (6) is mounted to the drive housing for intermittent or intermittent and reversing rotation about a first, generally horizontal axis (8). The reversing motion helps to release jams. The drive housing is coupled to and driven by the second driver so the drive housing and the spatula therewith rotate about a second, generally vertical axis (10). The spatula thus has both a sweeping and a turning or flipping action. An obstruction element (12) can be positioned beneath the spatula to operate in conjunction with the spatula to aid proper manipulation of the food within the cooking container.

28 Claims, 8 Drawing Sheets

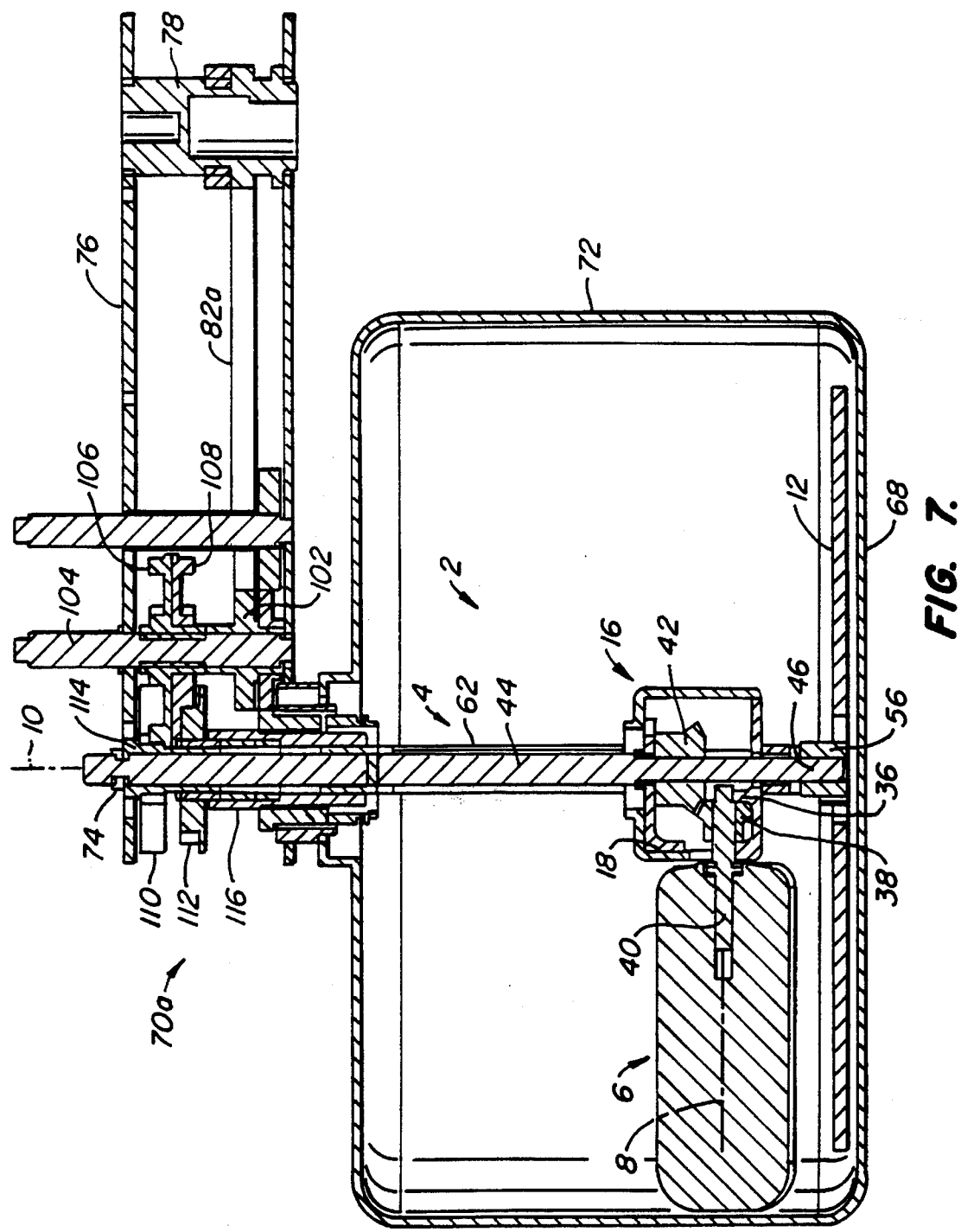

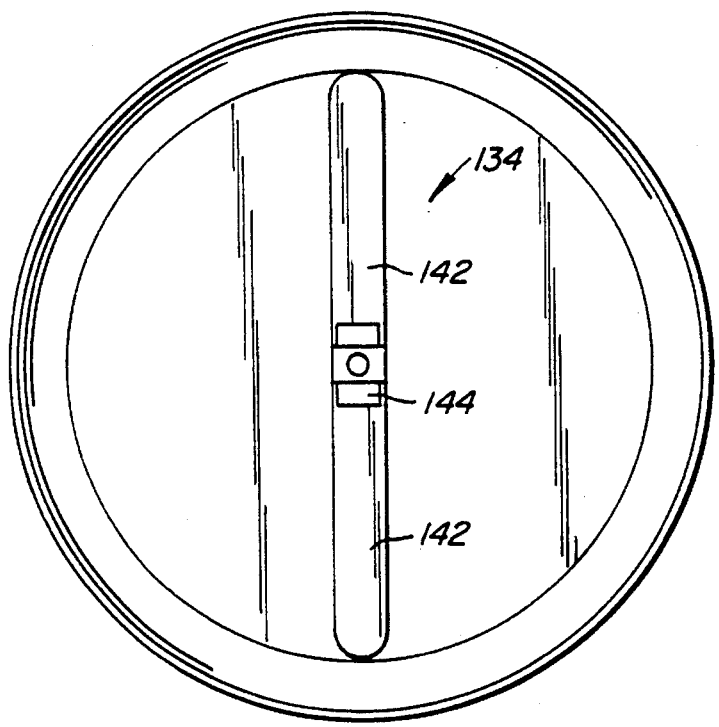 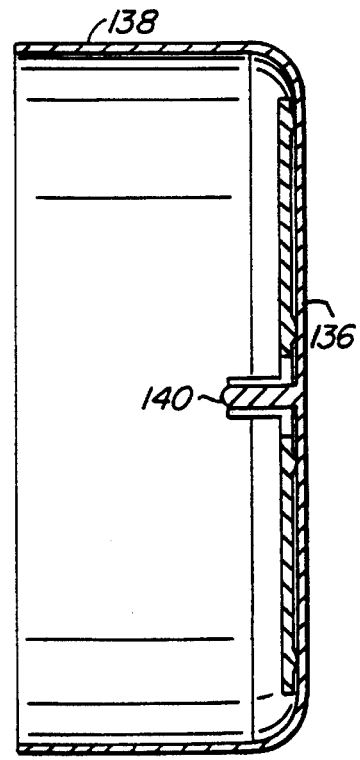
FIG. 9A.   FIG. 9B.
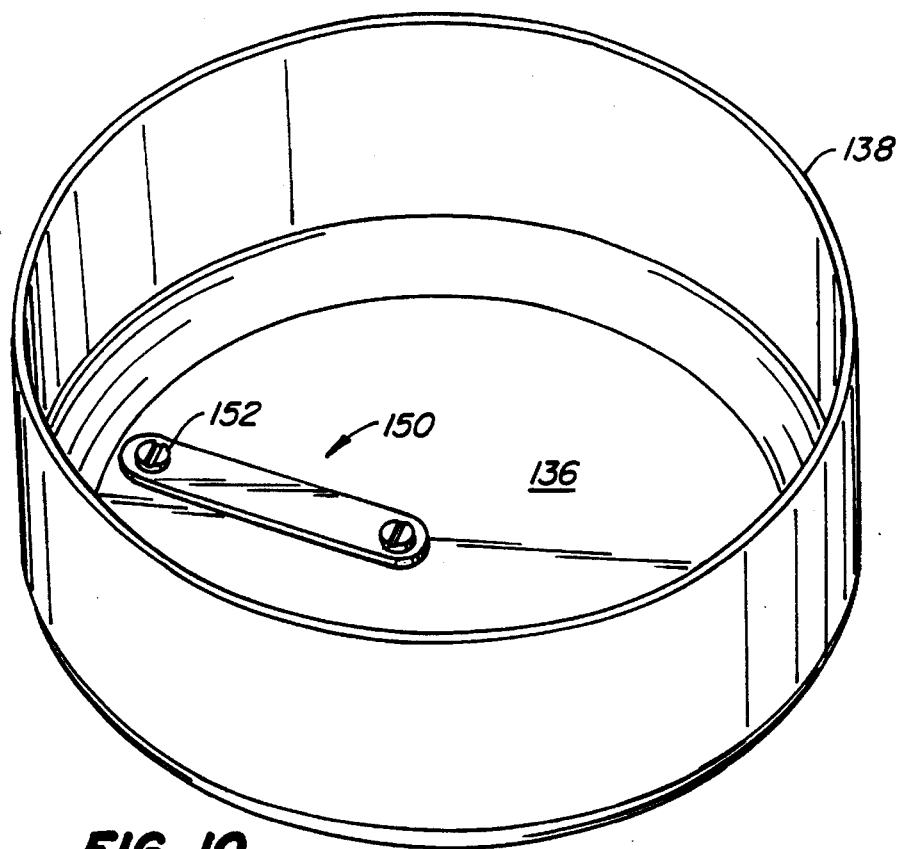
FIG. 10.

STIRRER ASSEMBLY FOR AUTOMATED COOKING MACHINE

BACKGROUND OF THE INVENTION

Automated cooking machines, such as bread makers, have become increasingly popular. Another type of automated cooking machine is shown in U.S. Pat. Nos. 4,649,810; 4,779,522; 4,820,054; 4,942,807, all issued to the present inventor, the disclosures of which are incorporated by reference. This type of automated cooking machine permits ingredients to be added at different times, stirred and turned or flipped. One way to implement a stirring action is to use a simple planar stirrer to scrape the bottom of the pot in a circular fashion. The shape of the stirrer will cause the food ingredients to spread out or tumble over the top of the stirrer. However, the overall action is not a true turn and flip motion so that its effectiveness is compromised in many situations. The turn and flip stirrer disclosed in, for example, U.S. Pat. No. 4,942,807, is an automated stirrer which will perform a true turn and flip function. However, in certain situations even the stirrer shown in the above-mentioned patent is not as effective as could be desired. This can occur when cooking a relatively small amount of an ingredient or when the cooking surface is extremely slippery, as could be caused by non-stick surface coatings or the presence of a sufficient amount of water, oil or other liquid. In these situations, the stirrer can have a tendency to push the ingredients forward rather than turning and flipping the ingredients. The slippage will render the two-axis stirrer less effective than it is designed to be. Therefore, an effective two-axis stirrer also depends on sufficient surface friction developed by the total weight of the ingredients to be pushed, turned and flipped.

SUMMARY OF THE INVENTION

The present invention is directed to a stirrer assembly or system finding particular utility when used with an automatic cooking machine. The assembly helps ensure proper flipping and turning motion of ingredients even in situations in which known two-axis spatulas may have a tendency to push the ingredients rather than turn or flip them.

The stirrer assembly includes a drive assembly having first and second drivers and a drive housing. A dual axis spatula is mounted to the drive housing for rotation about a first, generally horizontal axis. The spatula is coupled to and driven by the first driver so to rotate about the first axis. The drive housing is coupled to and driven by the second driver so the drive housing and the spatula therewith rotate about a second, generally vertical axis. Therefore, the spatula has both a sweeping action and a turning or flipping action.

An obstruction element is positioned beneath the spatula and operates in conjunction with the spatula to aid proper manipulation of the food within the cooking container. Preferably the obstruction element is coupled to and driven by the first driver in an intermittent manner. Therefore, the difference in rotation speeds of the obstruction element as it sweeps over the bottom of the cooking container and the spatula as it rotates about the second axis, causes the spatula to periodically pass over the obstruction element.

Another problem which has been recognized is the freeing of food jammed between the spatula and the bottom of the cooking container or the obstruction element, or both. Jamming can occur for several reasons. For example, an edge of the spatula might get caught on top of a large, hard ingredient. While the drive mechanism can be clutched to prevent damage to the machine, prevention of jamming is important. One way to solve the jamming problem is to use a reversible motor. This, however, is a relatively expensive option. Another is to use some sort of oscillating gear arrangement; such an arrangement has the potential for taking up too much space. A further solution would be to use a second scraper or wiper to continuously sweep the bottom of the cooking container. This solution would have the tendency to break up the food ingredients excessively.

This problem of food jams is addressed in a second embodiment. In this embodiment the spatula periodically reverses direction about the first, generally horizontal axis to free any food jams between the spatula and either the bottom of the cooking container or the obstruction element. This is preferably achieved using a pair of geneva drives. This solution costs less than a reversible motor, does not take up excessive space and does not tend to break up the food ingredients excessively.

One of the advantages of the invention is that the drive assembly is constructed to be taken apart without tools and permit the various drive elements to be cleaned completely by providing access to internal parts. This is achieved in the preferred embodiment using a drive housing having a cover and a generally C-shaped mounting cage which houses the bevel gears coupling the generally vertical drive shaft to the generally horizontal dual axis spatula. The cover has an interior and an open side through which the mounting cage can pass so that the mounting cage and the components within the mounting cage, including the bevel gears, are fully housed within the cover.

In a first embodiment the drive housing is driven constantly so to drive the dual axis spatula along a circular path in a horizontal plane at a generally constant rate of speed. The first driver, which rotates the dual axis spatula about its horizontal axis and rotates the obstruction or scraper element about the generally vertical axis, moves intermittently. This permits the dual axis spatula to periodically override the scraper element which prevents any continued sliding of the food along the surface of the cooking container by acting as an interruption at that time and point. The scraper element is preferably a one- or two-armed member depending on the amount of stirring desired. It could, however, have a curved shape and be made with a greater or lesser number of arms. The intermittent driving of the vertical drive shaft in the first embodiment is preferably accomplished using a geneva drive.

In the preferred embodiments the obstruction element is a rotatable scraper element. In some situations it may not be necessary to use a rotating scraper element. Rather, the obstruction element could be pivotally mounted to the base of the cooking utensil to create an obstruction in the path of any ingredients which may be being pushed around the cooking container due to insufficient friction. Additionally, a permanent rib or other obstruction could be formed into the inner surface of the bottom of the cooking container to create an obstruction.

Another feature of the invention is the mounting of the scraper element to the vertical shaft using an override coupler. If food is caught between the two-axis spatula as it begins to pass over one of the arms of the scraper element, the scraper element can be pushed forward by the spatula so to reduce the chance that the food will become jammed between the spatula and the scraper element and cause excessive damage to the food ingredients. An advantage of the invention arises when the spatula overrides the scraper; food ingredients which have undesirably clumped together get spread out over the bottom of the cooking container as is desired.

The invention has been discussed with reference to a cooking container. If desired the invention could be used for food preparation tasks other than cooking, such as mixing of ingredients.

Other features and advantages of the invention will appear from the following description in which the preferred embodiments have been set forth in detail in conjunction with the accompanying drawings.

BRIEF DESCRIPTION OF THE DRAWINGS

FIG. 7 is a view similar to FIG. 5 of an alternative embodiment of the invention;

FIGS. 9A and 9B are top plan and side cross-sectional views showing an alternative embodiment of the obstruction element or scraper of FIG. 1; and FIG. 10 is an isometric view illustrating a second alternative embodiment of the obstruction element of FIG. 1.

DESCRIPTION OF THE PREFERRED EMBODIMENTS

Figure 1:
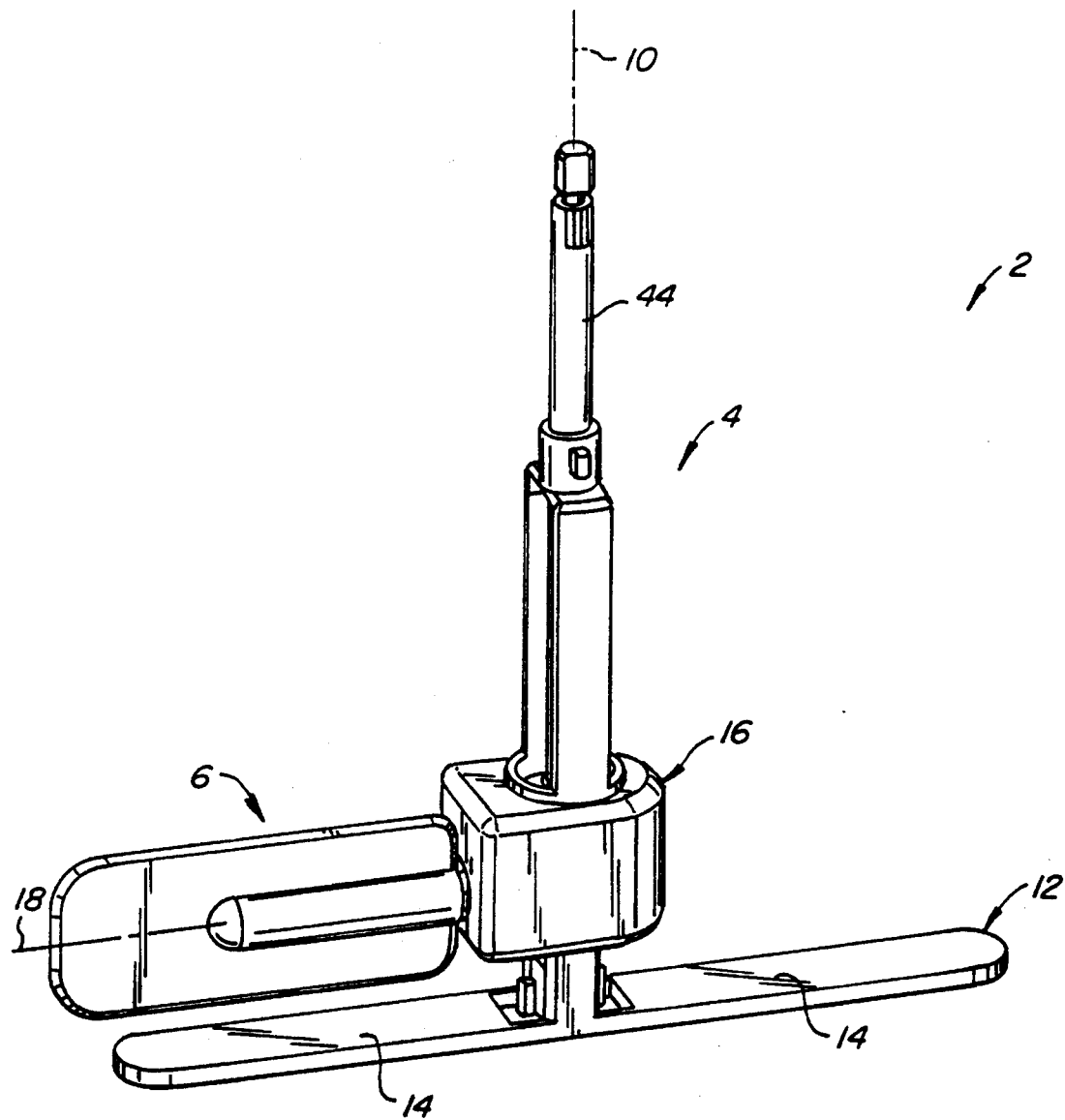
FIG. 1 is an overall view of a first embodiment of the stirrer assembly made according to the invention.

FIG. 1 illustrates a stirrer assembly 2 to include a drive assembly 4 which drives a two-axis or dual axis spatula 6 about a first, generally horizontal axis 8 and a second, generally vertical axis 10, and an obstruction element or scraper 12 having arms 14 and mounted to drive assembly 4 for movement about vertical axis 10.

Figure 2:
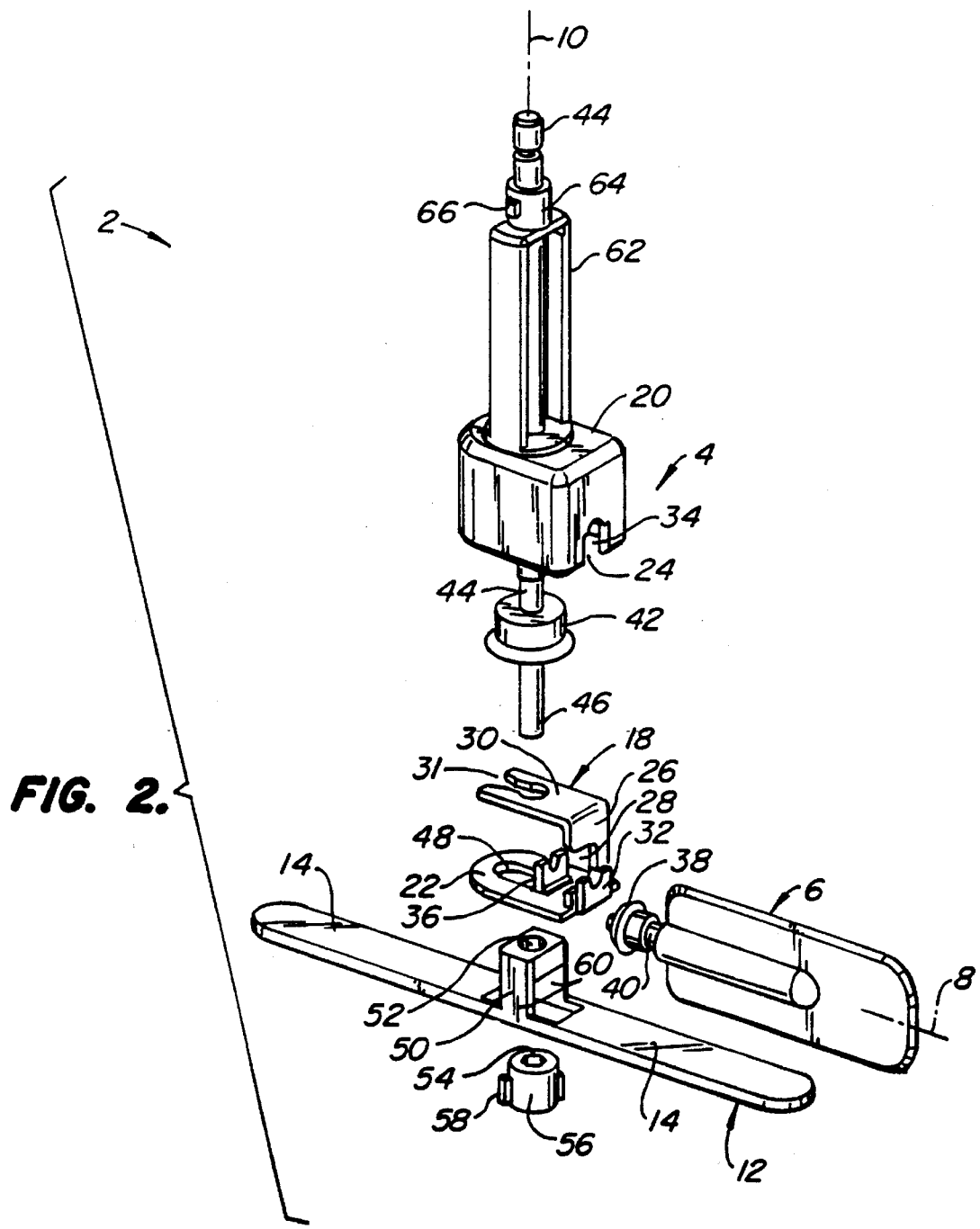
FIG. 2 is a partially exploded view of the stirrer assembly of FIG. 1.
Figure 3:
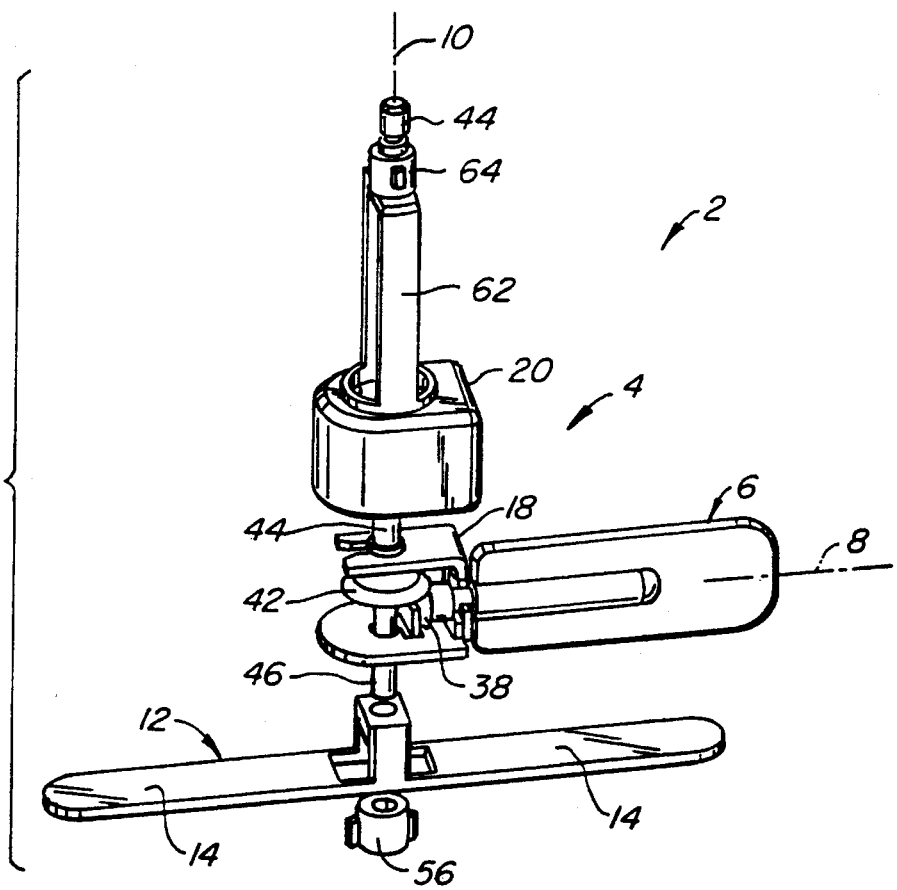
FIG. 3 shows the stirrer assembly of FIG. 2 with the first and second bevel gears mounted within the C-shaped mounting cage just prior to sliding the cover over the mounting cage and mounting the scraper to the lower end of the vertical drive shaft.

FIGS. 2 and 3 illustrate stir assembly 2 in partially assembled conditions. Drive assembly 4 includes a drive housing 16. Drive housing 16 includes a generally C-shaped mounting cage 18 and a cover 20. C-shaped mounting cage 18 includes a lower plate 22 which closes the open lower end 24 of cover 20. Mounting cage 18 also includes a vertical leg 26 having a lateral opening 28 formed therein and a horizontal leg 30 having a generally keyhole-shaped opening 31 formed at its distal end. Mounting cage 18 also includes an outer saddle piece 32 aligned with a downwardly opening slot 34 formed in cover 20 and an inner saddle piece 36 extending upwardly from lower plate 22. Lateral opening 28 and saddle pieces 32, 36 permit a first bevel gear 38 to be mounted within mounting cage 18 with a drive shaft 40, mounting first bevel gear 38 to spatula 6, to be captured between outer saddle piece 32 and the periphery of cover 20 defining slot 34 on one side of first bevel gear 38. The distal end of drive shaft 40 is supported by inner saddle piece 36 and is forced against the inner saddle piece by the engagement with a second bevel gear 42. Second bevel gear 42 is fixed to a vertical drive shaft 44 towards but spaced apart from its lower end 46. Drive shaft 44 passes through keyhole slot 31 in horizontal leg 30 and through a generally oval hole 48 formed in lower plate 22 of mounting cage 18. Thus, placing first bevel gear 38 within mounting cage 18, second bevel gear 42 within the mounting cage and engaged with the first bevel gear and then sliding cover 20 down onto mounting cage 18 secures vertical drive shaft 44 and horizontal drive shaft 40 to drive housing 16.

Scraper 12 includes an upwardly extending drive cage 50 having a central bore 52 through which lower end 46 of drive shaft 44 passes. Lower end 46 is mounted within the central bore 54 of an override coupler 56, the override coupler 56 being housed within drive cage 50. Override coupler 56 has a pair of ears 58 which extend far enough from the main body of the coupler to engage the upright arms 60 of drive cage 50 so that rotation of vertical drive shaft 44 rotates coupler 56 which, through the engagement of ears 58 and arms 60, causes scraper 12 to rotate as well about vertical axis 10. Override coupler 56 is preferably secured to end 46 of drive shaft 44 by a frictional fit capable of slipping. If desired, coupler 56 could be permanently secured to end 46 of driver shaft 44. This would require making oval hole 48 into an open-ended slot similar to slot 31 to permit drive shaft 44 to be passed laterally into position within mounting cage 18.

Rotation of vertical drive shaft 44 also rotates second bevel gear 42 which in turn rotates first bevel gear 38. However, in this first embodiment as vertical drive shaft 44 is rotated, drive housing 16 also rotates thus carrying spatula 6 therewith. Thus, spatula 6 both rotates about horizontal axis 8 and vertical axis 10 during use.

Drive housing 16 is driven through a drive housing extension 62 which terminates at a cylindrical upper end 64, upper end 64 having a pair of driving lugs 66 extending therefrom. In this first embodiment, drive housing extension 62 is rotated at a generally constant speed so that drive housing 16 also rotates at a constant speed and spatula 6 rotates about vertical axis 10 at a generally constant speed. Vertical drive shaft 44 is intermittently driven in this embodiment. This intermittent driving of vertical drive shaft 44 means that scraper 12 rotates, stops and then rotates again, that is, moves intermittently, about vertical axis 10. The rotation of spatula 6 about its horizontal axis 8 is determined by the intermittent rotation of drive shaft 44, which transmits a driving motion to spatula 6 through gears 42, 38 and shaft 40. However, the use of bevel gears 42, 38 also means that rotation of mounting cage 18 about vertical axis 10 causes first bevel gear 38 to walk along second bevel gear 42.

In this first embodiment the speeds of rotation are such that as the first, vertical drive shaft 44 is rotated, the rotation of second bevel gear 42 is cancelled out by the horizontal movement of spatula 6 in a horizontal plane, that is about vertical axis 10, causing first bevel gear 38 to walk along the second bevel gear 42. The result is that as drive shaft 44 is rotated, spatula 6 rotates about vertical axis 10 but effectively not at all about horizontal axis 8. However, once drive shaft 44 stops rotating, the rotation of drive housing extension 62 about vertical axis 10 causes spatula 6 to rotate about vertical axis 10 along with drive housing 16 but also causes bevel gear 38 to walk along bevel gear 42 thus rotating spatula 6 about horizontal axis 8. It is this motion that creates the turning or flipping motion desired.

In this first embodiment, spatula 6 catches up with or overruns one of the arms 14 of scraper 12 about once every revolution about vertical axis 10.

Figure 4A:
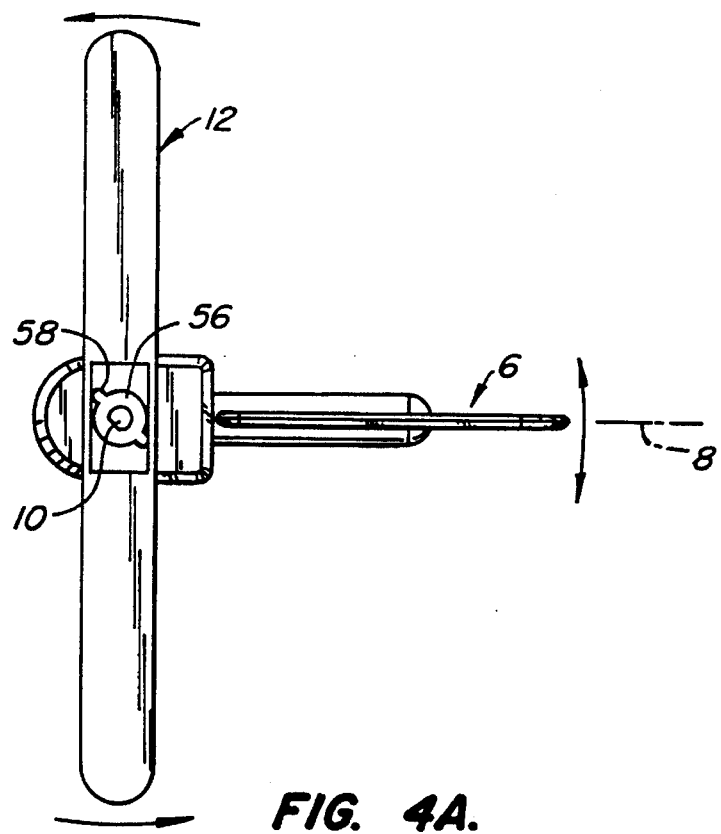
FIGS. 4A–4C illustrate the action of an overdrive coupler which allows the scraper to move forward in case of a food jam.
Figure 4B:
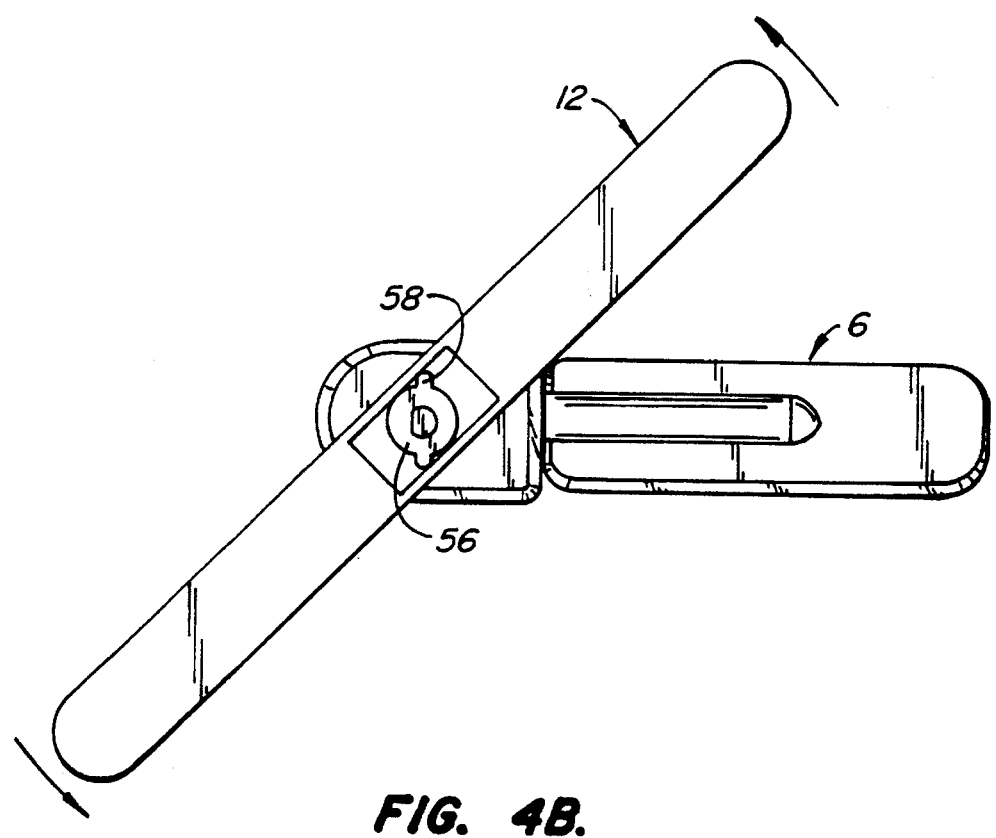
Figure 4C:
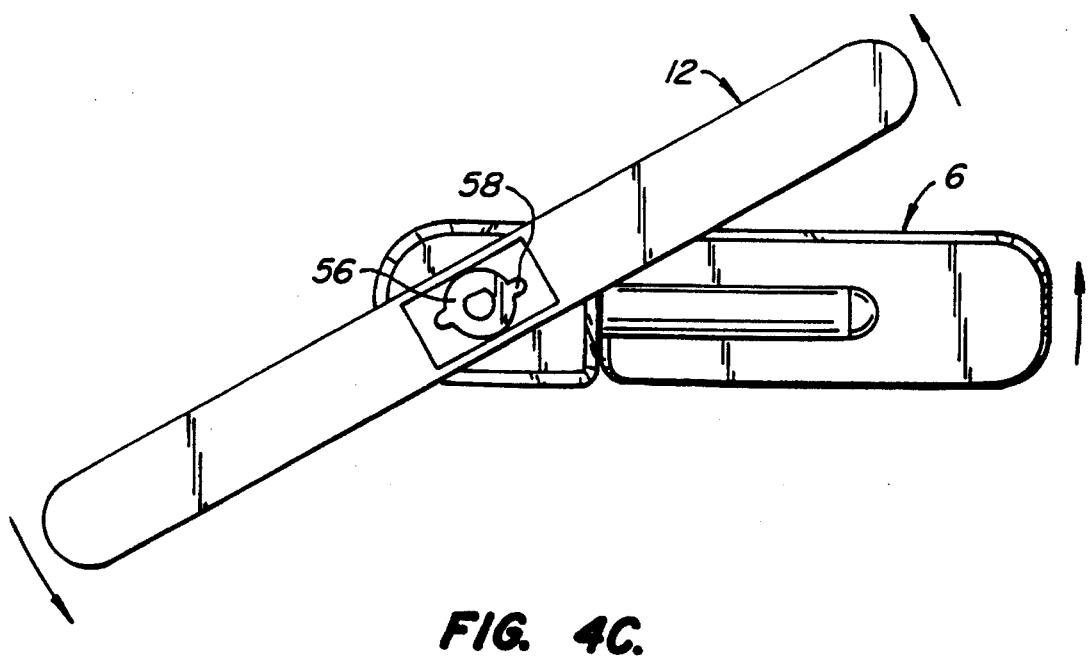

In some cases pieces of food can get jammed between the rotating spatula 6 and the arm 14 of scraper 12. To help prevent excessive tearing or other damage to the food pieces, overdrive coupler 56 comes into play. FIG. 4A shows the normal directions of movement of scraper 12 and spatula 6 about vertical axis 10. In FIGS. 4A and 4B, ears 58 of overdrive coupler 56 are seen to be actively engaging drive cage 50 and thus in position to drive scraper 12. However, at about the position of FIG. 4B, pieces of food may get jammed in between scraper 12 and spatula 6. When this occurs the spatula 6, which is constantly rotating about vertical axis 10, moves drive cage 50 of scraper 12 out of engagement with ears 58 as the spatula rotates the scraper in the direction of arrow 66 to permit the spatula to keep rotating without jamming against the scraper. As is evident from Figs. 4A-4C, in this embodiment scraper 12 is in its non-rotating mode while spatula 6 overrides the outer arms 14 of the scraper during its flipping or turning motion.

In this embodiment scraper 12 is positioned to be spaced apart a slight distance from the bottom 68 of cooking container 72. See FIG. 5. If desired, scraper 12 could be made to contact bottom 68 of cooking container 72, especially if scraper 12 were made of a lubricious, low friction material, such as PTFE. Spatula 6 is preferably made of a food grade engineering plastic, such as PTFE or high temperature nylon. Because scraper 12 is long and relatively thin, it is preferred that scraper 6 be made with a backbone or base of relatively stiff metal, such as stainless steel, covered by a layer of food grade, low friction plastic suitable for a cooking environment, such as PTFE or high temperature nylon. The other components of stirrer assembly 2 are preferably made of food grade metals, such as stainless steel.

Figure 5:
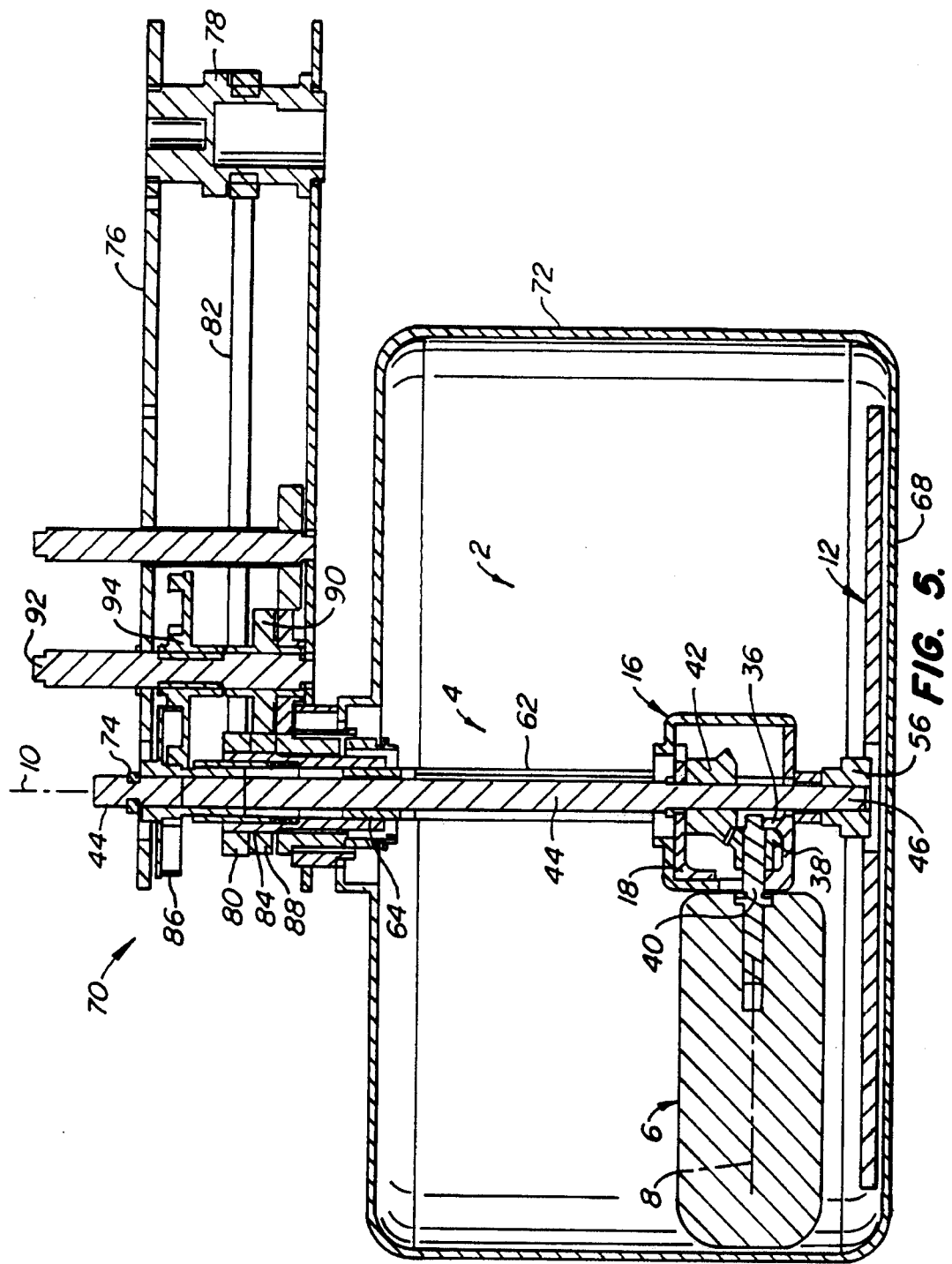
FIG. 5 is a cross-sectional view showing the stirrer assembly of FIG. 1 mounted to a cooking container and various drive elements used to drive the vertical drive shaft and the drive housing extension, both of which extend above the lid of the cooking container.

FIG. 5 illustrates stirrer assembly 2 in which drive assembly 4 is part of a combined drive assembly 70, stirrer assembly 2 being suspended within cooking container 72 using a retaining latch 74 to suspend assembly 2 from a gear box support plate 76. Combined drive assembly 70 includes a drive pulley 78 rotated by a drive motor, not shown. Drive pulley 78 is connected to a pulley 80 by a belt 82. Pulley 80 is fixed to a cylindrical coupler 84 which extends downwardly and engages lugs 66 extending from cylindrical upper end 64 of housing extension 62 thus driving drive housing 16. That is, rotation of drive pulley 78 directly drives drive housing 16. Vertical drive shaft 44 is secured to a geneva wheel 86, see FIG. 6. A gear 88 is fixed to coupler 84, and thus rotates with the coupler, and drives a gear 90.

Figure 6:
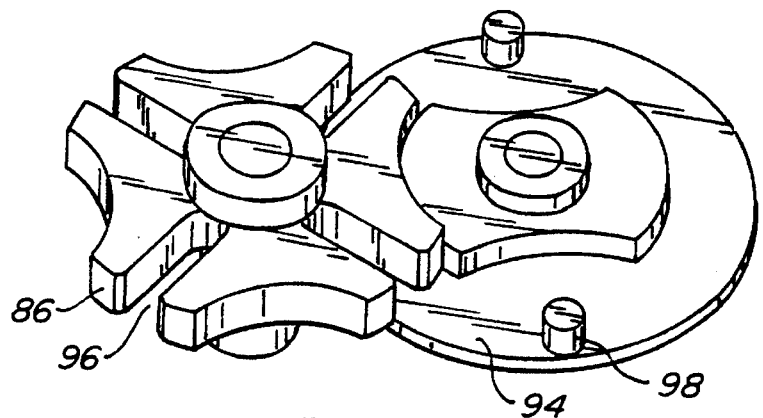
FIG. 6 is an overall view of a geneva drive such as that used to drive the vertical drive shaft of the stirrer assembly of FIG. 1 in an interrupted manner.

Gear 90 is fixed to a shaft 92 which drives a geneva driver 94. Geneva driver 94 engages geneva wheel 86 as illustrated in FIG. 6. Geneva wheel 86 has four slots 96 while geneva driver 98 has two pins 98. The result of this geneva set is effectively a 2 to 1 reduction in speed of vertical drive shaft 44 as compared with drive housing 16.

The use of the geneva system to implement the stop and turn motion for spatula 6 reduces the amount of turning which spatula 6 does and also provides an accumulate, spread and flip or turn motion.

The two-pin, four-position geneva system shown in FIG. 6 will create a 90° locking position and a 90° synchronized turning position. During the 90° of synchronized turning, both shaft 44 and housing 16 are turning simultaneously. When geneva wheel 86 is in an effectively locked position, as shown in FIG. 6, shaft 44 and bevel gear 42 are also a locked position. However, since housing 16 is turning, spatula 6 turns so that bevel gear 38 walks along bevel gear 42. During the next 90° rotation of geneva driver 94, a pin 98 of the geneva driver will engage a slot 96 of the geneva wheel causing shaft 44 and housing 16 to turn simultaneously at approximately the same speed. The essentially equivalent turning speed cancels out the reaction force between bevel gears 38, 42 so that spatula 6 remains in its position. The turning of housing 16 while spatula 6 is in the position of FIG. 1 helps to implement an accumulation or spread out motion for the spatula. This alternating turning and sweeping cycle repeats itself every 90° of rotation of drive housing 16.

If desired other types of intermittent drives can be substitutes for the four-position geneva system of FIG. 6. For example, a six-position geneva drive may be desirable since it requires less torque, and thus a smaller drive motor, for proper operation than the four-position geneva drive.

In use, the appropriate ingredients are placed in cooking container 72 and drive pulley 78 is rotated thus driving belt 82. Driving belt 82 causes the constant rotation of drive housing 16 thus causing spatula 6 to rotate about vertical axis 10 constantly. During alternating 90° rotations of drive housing 16, spatula 6 is either rotated about horizontal axis 10 or remains stationary about horizontal axis 10. Also, since drive shaft 44 only rotates during alternating 90° movements of drive housing 16, the difference in the speed of movement of spatula 6 and scraper 12 causes any food which may accumulate in front of spatula 6 to be driven up against scraper 12 thus permitting the spatula to turn or flip the food ingredients instead of merely sliding them along the bottom of cooking container 72. If food gets caught between the rotating spatula 6 and scraper 12, scraper 12, being loosely mounted to the lower end 46 of drive shaft 44 by an override coupler 56, can be driven forward to permit the continued rotational movement of spatula 6 about horizontal axis 10 minimizes jamming and damage to the food ingredients.

Figure 8B:
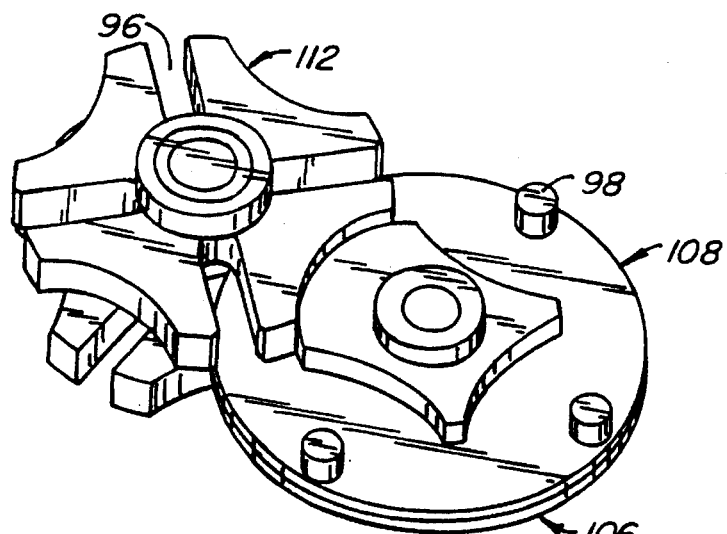
FIG. 8A and 8B are top and bottom isometric views of the upper and lower geneva drives of FIG. 7.
Figure 8A:
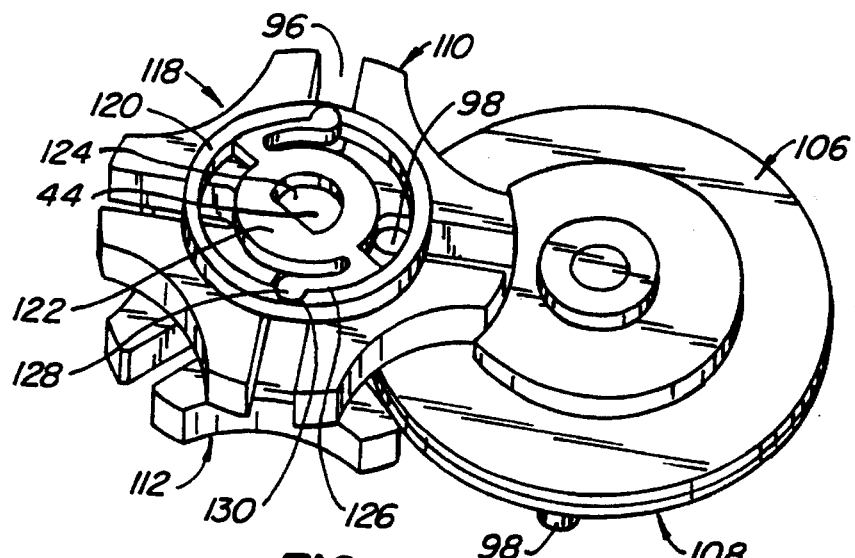

FIG. 7, 8A and 8B illustrate a second embodiment made according to the invention with like reference numerals referring to like parts. Combined drive assembly 70a is different from drive assembly 70 in that it rotates drive housing 16 about vertical axis 10 75% of the time while drive shaft 44 is rotated about axis 10 the other 25% of the time. This drive arrangement results in spatula 6 moving about vertical axis 10 75% of the time; during this time, bevel gear 38 walks along temporarily stationary bevel gear 42, thus rotating spatula 6 about horizontal axis 8 in a counter clockwise direction. During the other 25% of the time when drive housing 16 is not being rotated about vertical axis 10, rotation of drive shaft 44 cause bevel gear 42 to rotate bevel gear 38, which in turn, rotates spatula 6 in a clockwise direction about horizontal axis 8. Doing so provides a very effective anti-jamming mechanism for the machine. While the use of an obstruction element, such as scraper 12, should not be necessary when sufficient food ingredients are within container 72, jamming can still be a problem. This anti-jamming mechanism has been found especially helpful when cooking with, for example, large, hard pieces of food which can become jammed between an edge of spatula 6 and either the bottom 68 of cooking container 72 or scraper 12. This motion is achieved as follows.

Pulley 78 is driven by a unidirectional drive motor, not shown. Pulley 78 drives belt 82a which in turn drives a pulley 102. Pulley 102 is fixed to an axle 104. Upper and lower geneva drivers 106, 108 are also fixed to axle 104. Upper and lower geneva drivers 106, 108 drive upper and lower geneva wheels 110, 112 to create upper and lower geneva sets or drives. Upper geneva wheel 110 is secured to a cylindrical drive sleeve 114 by a clutch 118. Clutch 118 includes a clutch ring 120, which is an integral extension of upper geneva wheel 110, and a clutch disc 122, which is an integral extension of drive sleeve 114 and is positioned within clutch ring 120. Clutch disc 122 has a D-shaped opening 124 within which the D-shaped upper end of drive shaft 44 is housed. Clutch disc 122 has a pair of spring arms 126 with rounded ends 128 which engage like recesses 130 in clutch ring 120. The use of clutch 118 helps to prevent damage to the mechanism in the event of a jam. Lower geneva wheel 112 is fixed to a cylindrical drive sleeve 116. Both lower geneva wheel 112 and cylindrical drive sleeve 116 rotate freely about drive shaft 44. Cylindrical drive sleeve 116 is, however, drivingly coupled to upper end of 64 of drive housing extension 62 through lugs 66.

Geneva drives or sets are normally used for indexing purposes. They are quite useful in the present invention for intermittently driving housing 16 and drive shaft 44. For a 4-positioned geneva drive system, such as shown in FIGS. 8A and 8B in which wheels 110, 112 each have four slots 96, engagement of a pin 98 in a slot 96 causes the particular wheel 110, 112 to rotate 90° independent of one another. Without the engagement of the pins, such as shown in FIG. 8B, the geneva wheel is prevented from rotating do to the configuration of the corresponding geneva drive. To provide the reverse motion for spatula 6, pins 98 of geneva drive 108 are offset from the single pin 98 of geneva drive 106. As discussed above, rotation of drive shaft 44 occurs while extension 62 is stationary causing the clockwise rotation of spatula 6. While section 62 rotated about vertical axis 10, drive shaft 44 is stationary so that spatula 6 both rotates about the vertical axis 10 and about the horizontal axis 8 as its bevel gear 38 walks along the stationary bevel gear 42 thus rotating spatula 6 in a counter-clockwise motion about horizontal axis 8 as it sweeps about vertical axis 10.

The gear ratio between bevel gears 38, 42 determines the amount of rotation of spatula 6 about horizontal axis 8 for corresponding rotation or partial rotation of geneva drivers 106, 108. The number of pins for geneva driver 108 determines how often or fast spatula 6 should turn. Even though the stirring motion is a periodic motion in this embodiment, the starting and stopping positions, being 270° apart, provide a good overlap between each sweep of spatula 6 before its reverse horizontal rotation. This ensures that all parts of cooking container 72 will be properly stirred.

The embodiments described above both use a rotating scraper 12 as the obstruction element. FIGS. 9A and 9B illustrates a freely rotatable obstruction element 134 mounted to the base 136 of a lower container portion 138 by engaging a pin 140 extending upwardly from base 136. Obstruction element 134 has a pair of arms 142 having cutouts 144 adjacent to pin 140. If desired, obstruction element 134 could be driven about pin 140 instead of being freely rotatable about pin 140. FIG. 10 illustrates a second alternative obstruction element 150 semi-permanently secured to the bottom of 136 of lower container portion 138 by screws 152. Obstruction elements 134, 150 serve the same function as scraper 12 in that they keep food from piling up in front of spatula 6 to help ensure the proper turning or flipping of the food during the stirring motion.

Modifications and variation can be made to the disclosed embodiments without departing from the subject of the invention as defined in the following claims.

What is claimed is:

1. A stirrer assembly, for use with a food preparation container, comprising:
   a drive assembly comprising first and second drivers and a drive housing;
   a multi-motion spatula, mounted to the drive housing for movement about a first, generally horizontal axis;
   the spatula operably coupled to and driven by the first driver so to rotate about the first axis;
   the drive housing operably coupled to and driven by the second driver so the drive housing and the spatula therewith rotate about a second axis, the second axis oriented transversely to the first axis, so that the spatula has both sweeping and turning actions; and
   an obstruction element positioned beneath the spatula which operates in conjunction with the spatula to aid proper manipulation of food in a cooking container.

2. The stirrer assembly according to claim 1 wherein the first driver includes a generally vertical first drive shaft and first and second bevel gears housed within the drive housing.

3. The stirrer assembly according to claim 2 wherein the first bevel gear is drivingly coupled to the spatula and the second bevel gear is drivingly coupled to the first drive shaft.

4. The stirrer assembly according to claim 3 wherein the first bevel gear is rigidly fixed to the spatula and the second bevel gear is rigidly fixed to the first drive shaft.

5. The stirrer assembly according to claim 3 wherein said drive housing comprises a generally C-shaped mounting cage housing said first and second bevel gears.

6. The stirrer assembly according to claim 5 wherein said drive housing comprises a cover having an interior and an open side through which the mounting cage can pass for entry into said interior.

7. The stirrer assembly according to claim 6 wherein said first bevel gear and said spatula mounted thereto, said second bevel gear and the first drive shaft mounted thereto, the mounting case and the cover comprise a tool-less assembly structure which can be assembled and disassembled for cleaning without the use of tools.

8. The stirrer assembly according to claim 1 wherein the spatula is generally rectangular in shape.

9. The stirrer assembly according to claim 1 wherein the drive assembly further comprises a geneva driver driving a geneva wheel, said geneva wheel intermittently driving said first driver.

10. The stirrer assembly according to claim 1 wherein the obstruction element includes an elongate scraper element.

11. The stirrer assembly according to claim 1 wherein the obstruction element is a freely rotatable element.

12. The stirrer assembly according to claim 1 wherein the obstruction element is fixed relative to said spatula.

13. A combination of the stirrer assembly of claim 1 and a food preparation container, wherein the obstruction element is freely rotatably mounted to the food preparation container.

14. A combination of the stirrer assembly of claim 1 and a food preparation container, wherein the obstruction element is rigidly secured to the food preparation container.

15. The stirrer assembly according to claim 1 wherein said second driver is a constantly rotating driver and the first driver is an intermittently rotating driver.

16. The stirrer assembly according to claim 1 wherein said first and second drivers are intermittently rotating drivers.

17. The stirrer assembly according to claim 1 wherein the spatula is alternatingly driven about the first axis in first and second rotary directions.

18. The stirrer assembly according to claim 1 wherein the obstruction element is operably coupled to and driven by the first driver for movement about the second axis so that a difference in rotation speeds of the obstruction element and the spatula about the second axis causes one of the obstruction element and the spatula to pass the other of the obstruction element and the spatula.

19. The stirrer assembly according to claim 1 wherein the drive assembly further comprises a geneva driver driving a geneva wheel, said geneva wheel intermittently driving said first driver during a first drive cycle.

20. The stirrer assembly according to claim 19 further comprising a clutch operably coupling the geneva wheel to the first driver.

21. The stirrer assembly according to claim 19 wherein the drive assembly further comprises a second geneva driver driving a second geneva wheel, said second geneva wheel intermittently driving said second driver during a second drive cycle.

22. The stirrer assembly according to claim 21 wherein the first and second drive cycles do not overlap.

23. The stirrer assembly according to claim 21 wherein the spatula is driven about the first axis in a first rotary direction during said first drive cycle and in an opposite rotary direction during said second drive cycle.

24. The stirrer assembly according to claim 1 wherein the obstruction element is operably coupled to and driven by the first driver.

25. The stirrer assembly according to claim 24 further comprising override coupling means for coupling the obstruction element to the first driver to permit the obstruction element to be driven ahead of the first driver when an obstruction is caught between the obstruction element and the multi-motion spatula to permit the obstruction to clear.

26. A stirrer assembly, for use with a food preparation container, comprising:

a drive assembly comprising first and second drivers and a drive housing;

a multi-motion spatula, mounted to the drive housing and operably coupled to the first driver for alternating rotation in first and second rotary directions about a first, generally horizontal axis; and the drive housing operably coupled to and driven by the second driver so the drive housing and the spatula therewith intermittently rotate about a second, generally vertical axis so that the spatula has both sweeping and turning actions.

27. The stirrer assembly according to claim 26 wherein the drive assembly further comprises:

a first geneva driver driving a first geneva wheel, said first geneva wheel intermittently driving said first driver during a first drive cycle; and a second geneva driver driving a second geneva wheel, said second geneva wheel intermittently driving said second driver during a second drive cycle.

28. A stirrer assembly, for use with a cooking container, comprising:

a drive assembly comprising first and second drivers and a drive housing;

the drive assembly further comprising:

a first geneva driver driving a first geneva wheel, said first geneva wheel intermittently driving said first driver during a first drive cycle; and a second geneva driver driving a second geneva wheel, said second geneva wheel intermittently driving said second driver during a second drive cycle;

a multi-motion spatula, mounted to the drive housing and operably coupled to the first driver for alternating rotation in first and second rotary directions about a first, generally horizontal axis;

the drive housing operably coupled to and driven by the second driver so the drive housing and the spatula therewith intermittently rotate about a second, generally vertical axis so that the spatula has both sweeping and turning actions; and an obstruction element positioned beneath the spatula, the obstruction element being operably coupled to and driven by the first driver for movement about the second axis so that a difference in rotation speeds of the obstruction element and the spatula about the second axis causes one of the obstruction element and the spatula to pass the other of the obstruction element and the spatula to aid proper manipulation of food in a cooking container.

* * * * *